United States Patent [19]

Wakabayashi et al.

[11] Patent Number: 5,705,758
[45] Date of Patent: Jan. 6, 1998

[54] NON-MAGNETIC OR FEEBLY MAGNETIC DIAMOND SINTERED COMPACT AND A PROCESS FOR THE PRODUCTIN OF THE SAME

[75] Inventors: Takayoshi Wakabayashi; Akihiko Yamamura, both of Itami, Japan

[73] Assignee: Sumitomo Electric Industries, Ltd., Osaka, Japan

[21] Appl. No.: 586,721

[22] PCT Filed: Jun. 2, 1995

[86] PCT No.: PCT/JP95/01089

§ 371 Date: Jan. 29, 1996

§ 102(e) Date: Jan. 29, 1996

[87] PCT Pub. No.: WO95/33862

PCT Pub. Date: Dec. 14, 1995

[30] Foreign Application Priority Data

Jun. 3, 1994 [JP] Japan .................. 6-144062

[51] Int. Cl.$^6$ .................................. C22C 29/00
[52] U.S. Cl. .................. 75/243; 75/242; 419/11; 419/33; 419/48
[58] Field of Search .............. 75/243, 242; 419/11, 419/14, 33, 48; 428/548

[56] References Cited

U.S. PATENT DOCUMENTS

| | | | |
|---|---|---|---|
| 4,231,762 | 11/1980 | Hara et al. | 51/309 |
| 4,374,900 | 2/1983 | Hara et al. | 428/551 |
| 4,636,253 | 1/1987 | Nakai et al. | 75/239 |
| 5,304,342 | 4/1994 | Hall, Jr. et al. | 419/11 |

FOREIGN PATENT DOCUMENTS 62-83447  4/1987  Japan.
62-274034  11/1987  Japan.

*Primary Examiner*—Ngoclan Mai
*Attorney, Agent, or Firm*—Wenderoth, Lind & Ponack

[57] ABSTRACT

The object of the present invention is to provide a non-magnetic or feebly magnetic diamond sintered compact available for a magnetic article or magnetic material. This object can be achieved by a non-magnetic or feebly magnetic diamond sintered compact whose magnetic susceptibility is at most 3% of Fe, consisting of a high hardness sintered compact comprising at least 50 volume % of diamond with a grain size of 0.1 to 100 μm and a binder phase containing a metallic component selected from the group consisting of ferromagnetic iron group metals such as Ni, Co, Fe, etc. and mixtures thereof, in which at least one of feebly magnetic metal components each having a magnetic susceptibility of at most $5\times10^{-8}$ (emu/g), for example, Cr, V, Cu, Si, Zn, Al Mo, W, etc. is dissolved in a proportion of 1 to 50 volume % to the binder phase to form an alloy, whereby the magnetic moment of the diamond sintered compact having the binder phase containing the iron group metals and others, as a predominant component, is decreased by at least 80%.

7 Claims, 3 Drawing Sheets

5,705,758

NON-MAGNETIC OR FEEBLY MAGNETIC DIAMOND SINTERED COMPACT AND A PROCESS FOR THE PRODUCTIN OF THE SAME

TECHNICAL FIELD

This invention relates to a diamond sintered compact additionally provided with properties suitable for, in particular, an edge of a cutting tool and a wear resistance tool and more particularly, it is concerned with a nonmagnetic or feebly magnetic diamond sintered compact whose magnetic susceptibility is at most 3% of Fe.

In particular, the diamond sintered compact of the present invention can be applied to a wear resistance tool during transporting a magnetic product or producing a magnetic material utilizing the feature of the feeble magnetism thereof.

BACKGROUNDS TECHNIQUES

A diamond sintered compact, obtained by sintering fine diamond grains with an iron group metal such as Co, as a binder, at an ultra-high pressure and high temperature under which diamond is thermodynamically stable, has widely been used for cutting tools, wear resistance tools, wire-drawing dies, etc. utilizing its excellent strength as well as wear resistance. However, it is difficult at the present time to use, as a wear resistance tool for magnetic products, commercially available diamond compacts, the most part of which are produced by infiltrating Co in a diamond powder from WC—Co cemented carbides at an ultra-high pressure and high temperature, as described in Japanese Patent Publication No. 12126/1977 to give a ferromagnetic material.

A method comprising dissolving a feebly magnetic metal component in a ferromagnetic iron group metal and thereby changing the magnetic moment has been known, as exemplified by a graph showing a change of magnetic moment of Ni shown in FIG. 1 and FIG. 2 from "Handbook of Magnetism (Jisei Binran)". Japanese Patent Publication No. 14107/1986 describes a diamond sintered compact in which iron group metals and carbides, nitrides and borides of Ti, Zr, Hf, V, Nb, Ta and Cr are dissolved in a binder phase of diamond, but this aims at preventing grain growth of diamond and is silent as to the magnetic property.

As the magnetism-free diamond sintered compact, there are marketed a diamond sintered compact from which the binder metal is leached with an acid, as disclosed in U.S. Pat. No. 4224380 and a diamond sintered compact using a ceramic material such as SiC, etc. as a binder, as disclosed in Japanese Laid-Open Publication No. 236650/1986. These diamond sintered compacts do not have magnetism, nor simultaneously allow electric current to pass, so an electric discharge working, commonly used as a working method of diamond, cannot be used but the compacts are applied to only limited uses such as fine wire drawing dies for laser working.

When using the diamond sintered compacts of the prior art as a wear resistance tool of a claw or absorption nozzle for transporting or conveying magnetic products, the products tend to adhere to the tool and is hardly peeled off, or the positioning precision during transporting is deteriorated to result in difficulty in use of the tool. As a wear resistance tool during producing a magnetic material such as a guide for a magnetic tape, they cannot be used because of checking the magnetic property of the products.

The principal object of the present invention is to provide a non-magnetic or feebly magnetic diamond sintered compact capable of solving these problems and being applied to magnetic products or magnetic materials.

DISCLOSURE OF THE INVENTION

The inventors have made various efforts to overcome the disadvantage that the diamond sintered compacts of the prior art have strong magnetism and consequently, have succeeded in decreasing the magnetic moment of an iron group metal in the binder phase by at least 80% while maintaining the bonding strength of diamond grains with each other as it is by dissolving a predetermined amount of another feebly magnetic metal component in the binder phase of the iron group metal, and thereby also decreasing the magnetic moment of the diamond sintered compact itself by at least 80%.

That is to say, the present invention provides a non-magnetic or feebly magnetic diamond sintered compact whose magnetic susceptibility is at most 3% of Fe, consisting of a high hardness sintered compact comprising at least 50 volume % of diamond with a grain size of 0.1 to 100 μm and a binder phase containing a metallic component selected from the group consisting of ferromagnetic iron group metals such as Ni, Co, Fe, etc. and mixtures thereof, in which at least one of feebly magnetic metal components each having a magnetic susceptibility of at most $5 \times 10^{-6}$ (emu/g), for example, Cr, V, Cu, Si, Zn, Al, Mo, W, etc. is dissolved in a proportion of 1 to 50 volume % to the binder phase to form an alloy, whereby the magnetic moment of the diamond sintered compact having the binder phase containing the iron group metals and others, as a predominant component, is decreased by at least 80%.

BEST EMBODIMENT FOR CARRYING OUT THE INVENTION

Figure 1:
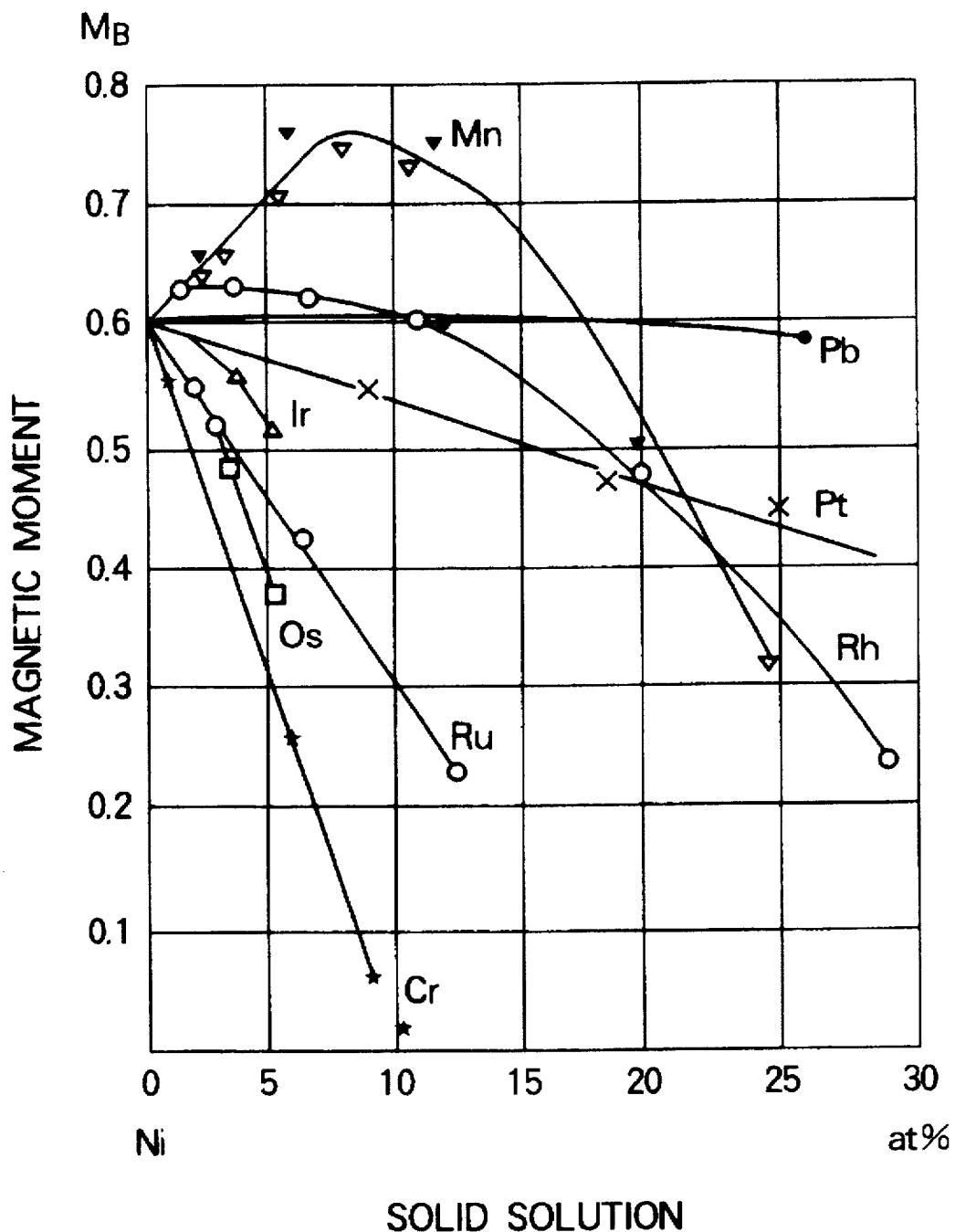
FIG. 1 is a graph showing a change of magnetic moment of Ni by forming a solid solution with a feebly magnetic metal.
Figure 2:
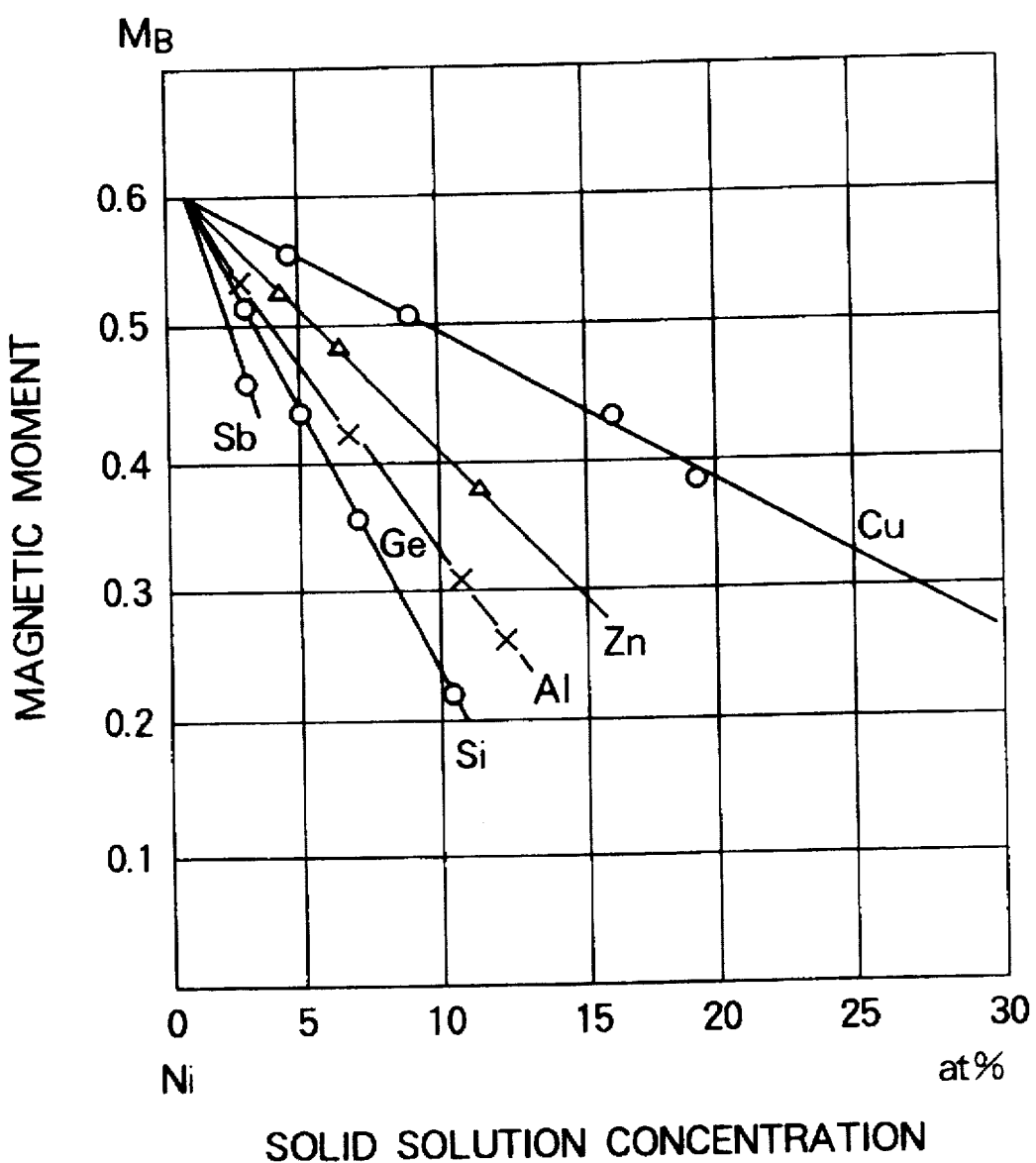
FIG. 2 is another graph showing a change of magnetic moment of Ni by forming a solid solution with a feebly magnetic metal.

In the present invention, it is effective to use, as a metallic component to be dissolved in the iron group metal, feebly magnetic metals each having a magnetic susceptibility of at most $5 \times 10^{-6}$ (emu/g) such as Cr, V, Cu, Mo, Al, W, Si, Zn, etc. [Cf. Magnetic Susceptibility of Elements shown in "Handbook of Magnetism (Jisei Binran)"], but the effect of decreasing magnetism cannot effectively be exhibited unless the microscopic dispersibility of the binder phase metal is uniform for the same binder phase metallic component. In order to solve this problem, the following two methods are taken into consideration, i.e. ① a method comprising rendering metallic component grains finer than diamond grains to be the binder phase and said diamond grains as the predominant component and previously dispersing them uniformly and ② method comprising uniformly infiltrating a metallic component to be the binder phase into diamond grains under the diamond sintering conditions at an ultra-high pressure and a high temperature. However, it is found most effective to infiltrate, by the method ②, the metallic component having the binder phase composition into the raw material powders, previously mixed with 1 to 90% of the metallic component in the binder phase by the method ①. Production of the raw material powders of ① is generally carried out by a method comprising using a metallic powder having a finer grain size than the raw material diamond powder, or a method comprising mixing with a metal oxide or metal carbide having a 1 to 3 times coarser grain size than the raw material diamond powder and then subjecting the mixture to mechanical crushing to render it finer than the diamond powder, followed by a reducing treatment, etc.

For the production of the non-magnetic or feebly magnetic diamond sintered compact according to the present invention, the commonly used cemented carbides such as WC-10% Co, We-8% Co, etc., cermets such as MoC-15% Ni-5% Co, etc. can also be used as a high strength metal carbide to be bonded with the sintered compact. As a non-magnetic or feebly magnetic metal carbide to be bonded with the sintered compact, there can be used non-magnetic cemented carbides with a composition of WC—Ni—Cr, for example, WC-12% Ni-0.6% Cr, WC-8% Ni-0.4% Cr, etc. These materials can be used in the form of either a previously sintered compact or in situ sintered compact.

The present invention has succeeded in reduction of the magnetism of a diamond sintered compact, as illustrated above, but the diamond sintered compact has generally been commercially available as a jointed article for the purpose of improving the brazing strength or reinforcing and the cemented carbide used as a jointed article with the diamond sintered compact generally comprises a high hardness metal carbide such as WC, etc. sintered with an iron group metal such as Co or Ni as a binder to be ferromagnetic. Even if a non-magnetic or feeble magnetic diamond sintered compact is prepared, therefore, combination thereof with the ordinary cemented carbides to form a jointed article results in a ferromagnetic body as a whole. The present invention has succeeded in rendering non-magnetic or feebly magnetic a diamond sintered compact, as a whole, even in the form of a jointed article with the ordinarily and commercially available cemented carbides by the use of a non-magnetic or feebly magnetic cemented carbide for the jointed article, the cemented carbide containing a binder in which a feebly magnetic metal is dissolved.

A procedure for obtaining a non-magnetic or feebly magnetic alloy by dissolving a feebly magnetic metallic component in a ferromagnetic iron group metal has been known and has widely been applied to stainless steels, etc. In the present invention, this technique is applied to reduction of the magnetism of a binder metallic component during producing a diamond sintered compact. The reason why such a technique has not been applied to a diamond sintered compact up to the present time lies in difficulty of uniformly dispersing many kinds of metallic components in the diamond sintered compact. In order to solve this problem, it has been employed to use an ultra-fine metallic powder having a smaller grain size than diamond powder or to use a powder of metal carbide or oxide having such a hardness as can readily be crushed in a step of crushing and crush the powder while mixing with the diamond powder as the raw material. Thus, many kinds of the metallic components with a finer grain size than the raw material diamond powder can uniformly be dispersed and a non-magnetic or feebly magnetic diamond sintered compact is developed. Furthermore, it is found that a blank material of a non-magnetic or feebly magnetic diamond sintered compact having the same shape, in general, as commercially available blank materials of diamond sintered compacts can be provided by bonding the non-magnetic or feebly magnetic diamond sintered compact with a non-magnetic or feebly magnetic cemented carbide.

The embodiments of the present invention are summarized below:

(1) A non-magnetic or feebly magnetic diamond sintered compact provided with a high strength metal carbide alloy, wherein the non-magnetic or feebly magnetic diamond sintered compact described in embodiments 1 or 2 is produced in contact with a high strength metal carbide alloy.

(2) The non-magnetic or feebly magnetic diamond sintered compact provided with a high strength metal carbide alloy, described in the above (1), wherein the high strength metal carbide alloy is WC sintered with 3 to 20 weight % of Co.

(3) A non-magnetic or feebly magnetic diamond sintered compact provided with a non-magnetic or feebly magnetic metal carbide alloy, whose magnetic susceptibility, as a whole, is at most 3% of Fe, wherein the non-magnetic or feebly magnetic diamond sintered compact described in embodiments 1 or 2 is produced in contact with a non-magnetic or feebly magnetic metal carbide alloy.

(4) The non-magnetic or feebly magnetic diamond sintered compact provided with a non-magnetic or feebly magnetic metal carbide alloy, described in the above (3), wherein the non-magnetic or feebly magnetic metal carbide alloy is WC sintered with 5 to 25 weight % of Ni and 5 to 25 weight %, based on Ni, of Cr.

(5) A process for the production of a non-magnetic or feebly magnetic diamond sintered compact, described in embodiments 1 to 4, which comprises sintering a raw material powder obtained by mixing diamond powder, as a predominant component, with a metal to be a binder phase and a metallic component to be dissolved in the binder phase, crushed to give a grain size of smaller than the diamond powder as a predominant component, under conditions of the diamond-stable range.

(6) A process for the production of a raw material powder of a non-magnetic or feebly magnetic diamond sintered compact, described in embodiments 5, wherein the metallic component is a metal oxide or a metal carbide having such a hardness as can be crushed in a crushing step by an attriter, ball mill, shaker mixer, etc. to give a grain size of smaller than the diamond powder, and after mixing these materials, the metallic component having a grain size of smaller than the diamond powder is precipitated, for example, by a reducing treatment.

(7) A process for the production of a non-magnetic or feebly magnetic diamond sintered compact, described in embodiments 1 to 4, which comprises infiltrating 10 to 99% of a metal to be the binder phase and a metallic component to be dissolved in the binder phase into a raw material powder, obtained by mixing a diamond powder with a metal to be the binder phase and a metallic component to be dissolved in the binder phase by the method described in embodiment 5 or 6, from the metal and metal carbide alloy in contact with the raw material powder and simultaneously sintering, under sintering conditions in the diamond-thermodynamically-stable range at an ultra-high pressure and temperature.

The present invention will specifically be illustrated by the following Examples.

(Example 1)

Figure 3:
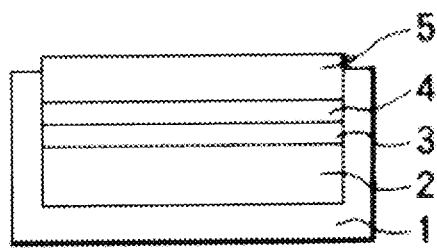
FIG. 3 is a schematic view of a capsule structure for the production of a diamond sintered compact shown in Example 1.
Figure 4:
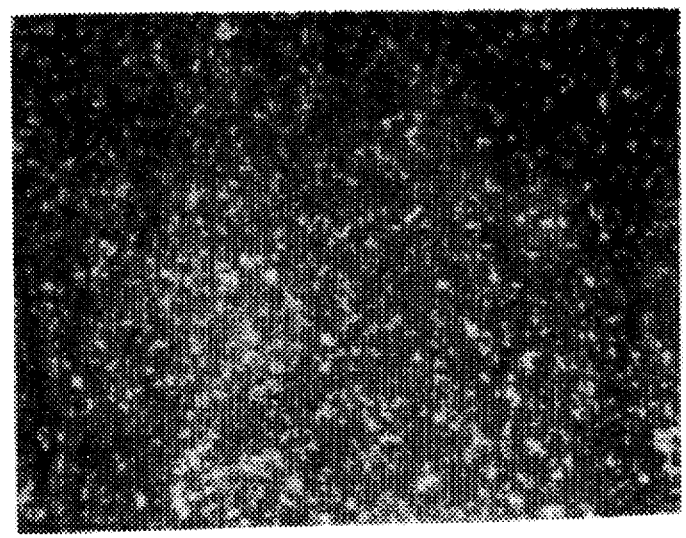
FIG. 4 is an electron micrograph showing a bonded alloy structure of the diamond sintered compact obtained by the method shown in Example 1.

10 weight %, based on the weight of diamond powder, of a Ni oxide powder having a grain diameter of 1 μm and 5 weight % of a Cr carbide powder having a grain diameter of 5 μm were added to the diamond powder having a grain diameter of ½ to 2 μm, crushed and mixed in a ball mill and then subjected to a reducing treatment at 1100° C. in a vacuum furnace to prepare a raw material powder. This raw material powder 2 was charged in a container 1 made of a non-magnetic cemented carbide with a composition of WC-8 weight % Ni-0.4 weight % Cr, in which Ni metal 3 and Mo metal 4 for infiltration were further inserted on one side thereof, and then covered with a cemented carbide plate 5 to form a capsule (Cf. FIG. 3). The resulting capsule was compressed to 5 GPa using an ultra-high pressure and high temperature apparatus used for the synthesis of diamond, then subjected to temperature rising to 1400° C. and maintained for 20 minutes. After lowering the temperature and pressure, the cover of the cemented carbide was cut and removed to obtain a diamond sintered compact fitted with a non-magnetic cemented carbide. When the magnetism of the diamond sintered compact was measured by a ferrite content meter, the magnetic susceptibility is only 0.3% of Fe, corresponding to 6% of the magnetic moment of a diamond sintered compact prepared, for comparison, adding no Cr carbide to the raw material and using no Mo plate for infiltration in the above described procedure. Namely, it was favorably carried out to lower the magnetic moment by at least 90%. When the diamond sintered compact of the present invention was subjected to a lapping working and examination of the bonded state of diamond, it was confirmed to be a uniform sintered compact, as shown in a metallic microphotograph of FIG. 4 (magnification: ×1000). According to this preparation procedure, moreover, there was obtained a feebly magnetic diamond sintered compact blank material provided with a non-magnetic cemented carbide, whose whole magnetic susceptibility was at most 0.3% of Fe.

(Example 2)

When a diamond sintered compact was prepared from the raw material powder of Example 1 in the same procedure of Example 1 except using no Mo plate for infiltration and subjected to estimation in the same manner as Example 1, the magnetism of the diamond sintered compact was lowered by only 50%. It was confirmed that the synergistic effect of decreasing the magnetic moment was generated by using two or more feebly magnetic metal components to be dissolved.

(Example 3)

When a diamond sintered compact was prepared in an analogous manner to Example 1 except charging the raw material of Example 1 in a cemented carbide of WC-8 weight % Co and subjected to estimation in an analogous manner to Example 1, the magnetic moment of the diamond sintered compact was lowered by 90%. According to this preparation procedure, there was obtained a feebly magnetic diamond sintered compact blank material provided with a ferromagnetic cemented carbide.

(Example 4)

10 weight %, based on the weight of diamond powder, of metallic Ni powder having a grain diameter of 1 μm, 5 weight % of a Cr carbide powder having a grain diameter of 5 μm and 2 weight % of a Cu oxide powder having a grain diameter of 2 μm were added to the diamond powder having a grain diameter of 2 to 4 μm, crushed and mixed in a ball mill and then subjected to a reducing treatment at 1100° C. in a vacuum furnace to prepare a raw material powder. This raw material powder was charged in a container made of a non-magnetic cemented carbide with a composition of WC-8 weight % Ni-0.4 weight % Cr, in which Ni metal and Al metal for infiltration were further inserted on one side thereof, and then covered with a cemented carbide plate to form a capsule. The resulting capsule was compressed to 5 GPa using an ultra-high pressure and high temperature apparatus used for the synthesis of diamond, then subjected to temperature rising to 1400° C. and maintained for 20 minutes. After lowering the temperature and pressure, the cover of the cemented carbide was cut and removed to obtain a diamond sintered compact fitted with a non-magnetic cemented carbide. When the magnetism of the diamond sintered compact was measured by a ferrite content meter, the magnetic susceptibility is only 1.0% of Fe, corresponding to 18% of the magnetic moment of a diamond sintered compact prepared, for comparison, adding no Cr carbide, nor Cu oxide to the raw material and using no Mo plate for infiltration in the above described procedure. Namely, it was favorably carried to lower the magnetic moment by at least 80%.

Utility and Possibility on Commercial Scale

As illustrated above, the non-magnetic or feebly magnetic diamond sintered compact obtained by the present invention can effectively be applied to a wear resistance tool for transporting a magnetic product causing a problem on magnetism or a wear resisting part such as a guide, etc. during producing a magnetic material. In particular, the non-magnetic or feebly magnetic a diamond sintered compact fitted with a non-magnetic or feebly magnetic metal carbide alloy, prepared in the form of a jointed article with the non-magnetic or feebly magnetic cemented carbides, can readily be worked in the same shape as that of the commercially available diamond sintered compact blank material fitted with any shape of the cemented carbide and can thus be used in all fields of wear resistance articles causing problems on magnetism, thereby markedly improving the service life of the prior art articles utilizing the high hardness property of diamond.

We claim:

1. A non-magnetic or feebly magnetic diamond sintered compact whose magnetic susceptibility is at most 3% of Fe, consisting of a high hardness sintered compact comprising at least 50 volume % of diamond powder with a grain size of 0.1 to 100 μm and a binder phase containing at least one metallic component selected from the group consisting of ferromagnetic iron group metals and mixtures thereof, in which at least one of feebly magnetic metal components each having a magnetic susceptibility of at most $5 \times 10^{-6}$ (emu/g) is dissolved in a proportion of 1 to 50 volume % to the binder phase to form an alloy, whereby the magnetic moment of the diamond sintered compact having the binder phase containing the group of iron group metals, as a predominant component, is decreased by at least 80%.

2. The non-magnetic or feebly magnetic diamond sintered compact as claimed in claim 1, wherein the ferromagnetic iron group metals are Ni, Co and Fe and the feebly magnetic metal components are Cr, V, Cu, Si, Zn, Al, Mo and W.

3. A non-magnetic or feebly magnetic diamond sintered compact provided with a high strength metal carbide alloy, wherein the non-magnetic or feebly magnetic diamond sintered compact described in claim 1 is produced in contact with a high strength metal carbide alloy.

4. A non-magnetic or feebly magnetic diamond sintered compact provided with a non-magnetic or feebly magnetic metal carbide alloy, whose magnetic susceptibility, as a whole, is at most 3% of Fe, wherein the non-magnetic or feebly magnetic diamond sintered compact described in claim 1 is produced in contact with a non-magnetic or feebly magnetic metal carbide alloy.

5. A process for the production of a nonmagnetic or feebly magnetic diamond sintered compact, described in any one of claims 1 to 4, which comprises sintering a raw material powder obtained by mixing diamond powder, as a predominant component, with a metal to be a binder phase and a metallic component to be dissolved in the binder phase, crushed to give a grain size of smaller than the diamond powder as a predominant component, said sintering being performed under conditions in the diamond-stable range.

6. A process for the production of a raw material powder for a non-magnetic or feebly magnetic diamond sintered compact, described in claim 5, wherein the metallic component is a metal oxide or a metal carbide having such a hardness as can be crushed in a crushing step by an attriter, ball mill or shaker mixer, to give a grain size of smaller than the diamond powder, and after mixing these materials, the metallic component having a grain size of smaller than the diamond powder is produced by a reducing treatment.

7. A process for the production of a nonmagnetic or feebly magnetic diamond sintered compact, described in any one of claims 1 to 4, which comprises infiltrating 10 to 99% of a metal to be the binder phase and a metallic component to be dissolved in the binder phase into a raw material powder, wherein the raw material powder is prepared by a) mixing diamond powder with a metal to be a binder and a metallic component to be dissolved in the binder phase and crushing the mixture to give a grain size of smaller than the diamond powder or b) mixing diamond powder with a metal to be a binder and a metal oxide or metal carbide having such a hardness as can be crushed in a crushing step to give a grain size of smaller than the diamond powder, to be dissolved in the binder phase, crushing the mixture and reducing the metal oxide or metal carbide, and simultaneously sintering the metal and metal carbide alloy in contact with the raw material powder, under sintering conditions in the diamond-thermodynamically-stable range at an ultra-high pressure and temperature.

* * * * *